Figure 1:
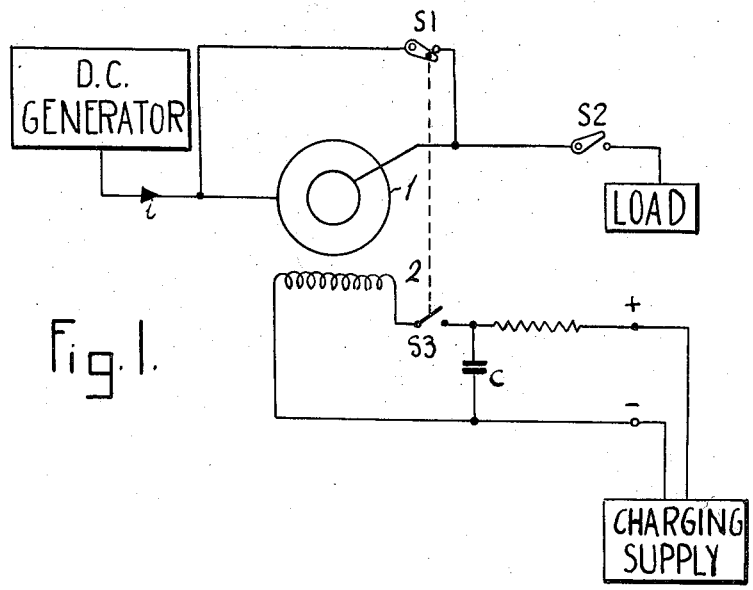

Sept. 24, 1963   J. J. MATTHEWS   3,105,171

HIGH VOLTAGE D.C. TRANSMISSION SYSTEMS

Filed July 3, 1961

INVENTOR
John Jenkin Matthews

BY *Miles D. Pillars*

ATTORNEY

United States Patent Office 3,105,171
Patented Sept. 24, 1963

3,105,171
HIGH VOLTAGE D.C. TRANSMISSION SYSTEMS
John Jenkin Matthews, Rugby, England, assignor to Associated Electrical Industries Limited, London, England, a British company
Filed July 3, 1961, Ser. No. 121,705
Claims priority, application Great Britain July 8, 1960
2 Claims. (Cl. 317—11)

This invention relates to the interruption of direct currents of high power.

Electric power transmission systems are coming into favour in which the power is interchanged between stations at the ends of a transmission line by the passage of direct current through the line. Should it become necessary to interrupt the direct current transmission circuit, difficulties arise which are not met with in A.C. transmission. In the latter case, since the current and voltage both have zero values during the alternating current cycle, the opening of the contacts of a circuit-breaker can be relied upon to interrupt the circuit at, or immediately after, a zero current value and arcing between the separating contacts need not occur for more than a few half-cycles provided that the circuit-breaker is properly designed and chosen for the duty expected. In the case of a circuit carrying direct current power of high value, the mere opening of the contacts of a circuit-breaker cannot be expected to interrupt the current without considerable and prolonged arcing, since no inherent current or voltage zero occurs to assist in arc extinction.

In order to interrupt the current in a D.C. circuit a potential source of E.M.F. may be introduced into the circuit in series with the contacts of a circuit-breaker and, prior to the opening of the contacts, the source of E.M.F. may be energised to produce a voltage substantially equal and opposite to the voltage appearing across the terminals of the source and the contacts opened to produce an interruption in the circuit when the current therein has been reduced substantially to zero.

The potential source of E.M.F. may be a dynamo-electric machine normally non-excited so that its terminal voltage is zero apart from the drop across the terminals due to the current in the circuit flowing therein. When the current is to be interrupted, the machine is excited and initially runs up as a motor to produce a back E.M.F. which is eventually substantially equal and opposite to the circuit voltage. When this occurs the contacts of the circuit-breaker may be opened since the voltage appearing across those contacts is then substantially zero and little tendency towards arcing across the contacts exists. When the circuit-breaker has been opened, the energisation of the machine can be removed.

The present invention is concerned with the interruption of high voltage direct current circuits and seeks to avoid the difficulty of designing a dynamo-electric machine to withstand the high D.C. voltage, both with respect to the commutator operation and insulation of the machine as a whole. The present invention accordingly provides an arrangement for the interruption of a high voltage D.C. circuit which makes use of a device involving the use of a high energy plasma as the energizing source of E.M.F. which is utilized to produce a voltage substantially equal and opposite to the voltage appearing across the terminals of the device so that the contacts can be opened to produce an interruption of the circuit once the current in the latter has been reduced substantially to zero.

Known types of such plasma devices exhibiting D.C. machine characteristics which are eminently applicable to the interruption of D.C. circuits have been described by others; examples are the "Homopolar" and "Ixion" described by W. R. Baker et al. and K. Boyer et al., respectively, at the Atoms for Peace Conference (Geneva 1958). Baker's original high energy rotating plasma device basically resembled a Faraday disc in which the disc had been replaced by a plasma sheet between concentric electrodes. The plasma is a part of the arc formed when the circuit current breaks down a low pressure gas between the electrodes. The plasma was caused to rotate (as the armature of a homopolar D.C. machine) between the concentric electrodes by means of an axial magnetic field in conjunction with a potential of suitable polarity applied there-between, the current flow traversing the axial magnetic field setting the plasma in motion. Such a device behaves as a Kapp vibrator for a period of time limited mainly by the arc stability, the effectiveness of the rotating plasma as a Kapp vibrator depending upon the amount of kinetic energy stored therein (about 4 joules/cc. kinetic energy density in Baker's original Homopolar I). In the same machine, the stability time was only $100\mu$ sec., but more recent work with rotating plasmas has achieved stability for up to a millisecond, a time sufficient for the device to be of interest for circuit-breaking applications. Voltage gradients of the order of 1 kv./cm. were generated in the plasma armature, so that rotating plasmas are consequently suitable for high voltage applications.

In the application of such a plasma device to the present invention, the electrodes are connected in the transmission circuit so as to have the circuit current passed between them. The plasma is caused to rotate between the electrodes by motor action and to produce the back E.M.F., which is required, as above-mentioned, to enable the circuit current to be reduced, and the circuit-breaker contacts opened. For stable operation of a plasma device in this way high magnetic field values and relatively low rotational velocities implying low working electric fields are required. It is hoped that an overall size of 1" diameter per rated kv. can be achieved which will probably require a magnetic field of 20–30 k. gauss. Gas filling pressures will be very low—probably less than $10^{-3}$ mm. Hg, the optimum gas being hydrogen. Some form of preionisation (e.g. by R.F. induction) may be necessary for the gas filling. In addition, to avoid instabilities, the plasma device, together with the disposition of its electrode connections, must be cylindrically symmetrical.

Figure 2:
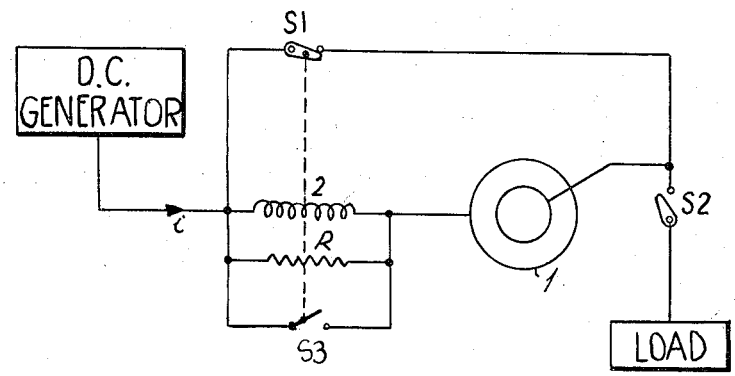

In order that the invention may be more readily understood, it will now be described with reference to the accompanying drawings, in which:

FIG. 1 is a diagram of a D.C. circuit showing the means by which the circuit is broken in accordance with the present invention, and FIG. 2 is a diagram of a D.C. circuit showing an alternative means by which the circuit may be broken.

Referring to FIG. 1 of the drawings, the potential source of E.M.F. 1, according to the present invention, formed by a rotating plasma device, is introduced with concentric electrodes as illustrated for convenience in the figures, into the D.C. circuit in series with the contacts of a circuit-breaker $S_2$. In order that the plasma device does not pass current permanently, it is preferably shunted by an auxiliary D.C. circuit-breaker of conventional design, and in this way, is limited to carrying current only during the period of interruption. On opening $S_1$, the main current $i$ from generator to load transfers to the plasma device 1, the voltage thereacross being, for example, of the order of a few hundred volts. The source of E.M.F. 1 is now energized—shown in FIG. 1 by the external connection of a charged condenser bank C, via the switch $S_3$ to the excitation field coils 2, this being the most economical arrangement since only a pulsed field is required. (For larger higher voltage arrangements, it is possible that refrigerated field coils continuously excited will prove to be more economical.) The source of E.M.F. 1 is consequently energised to produce a voltage substantially equal and opposite to that appearing across its terminals owing to the opening of $S_1$, the circuit current being reduced substantially to zero. The contacts of the circuit-breaker $S_2$ may then be safely opened without the occurrence of arcing thereacross.

Owing to the high value of excitation energy required for the plasma device in the arrangement shown in FIG. 1, it may be desirable and advantageous to gain some or all of it by series excitation. A method by which this can be done is shown in the accompanying FIG. 2, in which reference letters and numerals correspond, where appropriate, to those used in FIG. 1. In this case, on opening $S_1$, the current transfers to the E.M.F. source 1 and the resistor R in series with it, the switch $S_3$ being held open. When the appropriate value of the time constant $L/R$, where L is the inductance of the field coil 2, has elapsed, the current through the resistance R transfers to the field coil 2. At the same time, if the E.M.F. source 1 is formed by a rotating plasma device, as hereinbefore described, rotation of the plasma causes the external circuit current to fall. When the maximum series field is reached at the coil 2 and the switch $S_3$ is closed, this field falls off with a time constant long enough to permit interruption of the circuit to take place as before, the switch $S_2$ isolating the circuit when the current has fallen to zero. The condition for the current to fall to zero by Kapp vibrator action is that the total circuit series resistance should be less than $\sqrt{L_1,C_1}$, where $L_1$ is the total circuit series inductance and $C_1$ is the equivalent capacitance of the rotating plasma regarded as a Kapp vibrator. Except with light loads, when the external resistance is high, this is achieved by a suitable increase in $L_1$. For resistive loads the current to be interrupted must be small anyway. The first circuit current is not then reversed but is reduced to approximately $$1 - \frac{V}{E}$$

of its original value, where V is the back E.M.F. of the plasma motor and E is the open circuit line voltage.

If the back E.M.F. is 90% of the line voltage, a conventional 10 kv. circuit breaker at $S_2$ is able to open a 100 kv. circuit with the assistance of the plasma device. Anticipated ratings are of the order of 10–100 kv. with a current over 1,000 amps.

Since high voltage D.C. transmission is normally effected by way of a circuit, the input to which is by way of a rectifier, and the output from which is by way of an inverter, the circuit will normally include in addition a series reactor (not shown in the figures), for the purpose of smoothing the D.C. current transmitted. The presence of such a reactor in the circuit is beneficial from the point of view of circuit current interruption for the following reason. The plasma device acts as a Kapp vibrator in conjunction with the series reactor to tend to reverse the current in the circuit. Such reversal is prevented by the rectifier, so that a state is reached at which the current is zero and the rate-of-change of current is zero. This means that the current through the contacts of the circuit-breaker is reduced to zero and because the rate-of-change of current through the reactor is zero, no voltage is induced in the reactor, and no re-striking voltage appears across the contacts of the circuit-breaker.

What I claim is:

1. A current interrupting arrangement in a high voltage D.C. circuit, comprising a circuit-breaker, contacts of said circuit-breaker connected in said D.C. circuit, a plasma device, switching means for connecting said plasma device in series with said circuit-breaker contacts, means for producing a current in the plasma and for producing a magnetic field across the plasma to effect rotation of the plasma about a fixed axis for the generation of an E.M.F. substantially equal and opposite to the voltage across the terminals of the plasma device due to current flowing in the D.C. circuit, and further switching means for rendering the plasma current and magnetic field producing means effective.

2. A current interrupting arrangement as claimed in claim 1, in which the plasma device comprises concentric electrodes between which the plasma rotates, and in which voltage generating means are connected across said electrodes and means are provided for producing a magnetic field along the axis of said electrodes.

References Cited in the file of this patent
UNITED STATES PATENTS

| | | |
|---|---|---|
| 1,537,378 | Schon | May 12, 1925 |
| 1,818,969 | Brace | Aug. 18, 1931 |